United States Patent
Zeng

(10) Patent No.: US 11,187,966 B2
(45) Date of Patent: Nov. 30, 2021

(54) SET-TOP FLASH LAMP OF CAMERA

(71) Applicant: GODOX PHOTO EQUIPMENT CO., LTD., Shenzhen (CN)

(72) Inventor: Weijun Zeng, Shenzhen (CN)

(73) Assignee: GODOX PHOTO EQUIPMENT CO., LTD., Shenzhen (CN)

( * ) Notice: Subject to any disclaimer, the term of this patent is extended or adjusted under 35 U.S.C. 154(b) by 1837 days.

(21) Appl. No.: 14/778,591

(22) PCT Filed: Dec. 27, 2013

(86) PCT No.: PCT/CN2013/090667
§ 371 (c)(1),
(2) Date: Sep. 20, 2015

(87) PCT Pub. No.: WO2015/043100
PCT Pub. Date: Apr. 2, 2015

(65) Prior Publication Data
US 2021/0325764 A1    Oct. 21, 2021

(30) Foreign Application Priority Data
Sep. 26, 2013 (CN) .......................... 201320597920.7

(51) Int. Cl.
*G03B 15/05* (2021.01)
*F21L 4/00* (2006.01)
(Continued)

(52) U.S. Cl.
CPC ................ *G03B 15/05* (2013.01); *F21L 4/00* (2013.01); *G03B 15/03* (2013.01); *F21V 23/06* (2013.01)

(58) Field of Classification Search
CPC ...... G03B 15/05; G03B 15/035; G03B 15/03; G03B 15/02; G03B 15/0447; F21V 23/00;
(Continued)

(56) References Cited

U.S. PATENT DOCUMENTS 4,465,353 A * 8/1984 Yoshida .................... G03B 7/16
396/157
4,512,644 A * 4/1985 Yoshida ................. G03B 15/05
396/174

(Continued)

*Primary Examiner* — Bao Q Truong

(57) ABSTRACT

A set-top flash lamp of a camera, comprising a lamp holder (2) and a lamp cap (1). A battery accommodating cavity (4) and a battery accommodating cavity cover (3) are formed in the lamp holder (2). A lithium battery (5) is accommodated in the battery accommodating cavity (4), and the lithium battery (5) comprises an electrical output contact (6). The electrical output contact (6) is in the shape of a right-angled sheet, and is composed of end surface right-angled sides (61) and bottom surface right-angled sides (62), wherein the end surface right-angled sides (61) are located on the front end surface (51) of the lithium battery (5); and the bottom surface right-angled sides (62) are arranged on the bottom surface (52) of the lithium battery (5). An electrical access contact (7) is contained in the battery accommodating cavity (4), and is arranged on a side wall of the battery accommodating cavity (4) which is opposite to the bottom surface (52) of the lithium battery (5). The set-top flash lamp improves the performance and reduces the costs.

2 Claims, 3 Drawing Sheets

(51) Int. Cl.
*G03B 15/03* (2021.01)
*F21V 23/06* (2006.01)

(58) Field of Classification Search
CPC ........ F21V 23/06; F21V 33/0052; F21L 4/00;
F21L 4/04; F21L 4/085; F21W 2131/40
See application file for complete search history.

(56) References Cited

U.S. PATENT DOCUMENTS

| | | | |
|---|---|---|---|
| 4,530,034 A * | 7/1985 | Kawarada | G03B 15/05 362/9 |
| 5,794,082 A * | 8/1998 | Matsui | G03B 15/05 396/171 |
| 2016/0116826 A1 * | 4/2016 | Chen | G03B 15/05 362/9 |

* cited by examiner

SET-TOP FLASH LAMP OF CAMERA

TECHNICAL FIELD

The present application relates to an improved set-top flash lamp of a camera, and it belongs to the field photography equipment.

BACKGROUND

The set-top flash lamp of a camera is an auxiliary device used by the cameramen, it is very common. In the prior art, the set-top flash lamp of a camera includes a lamp holder, lamp cap, wherein the lamp cap is hinged onto the lamp holder, and it can rotate relative to the lamp holder. The lamp holder has a battery accommodating cavity formed therein, for the set-top flash lamp of a camera, all the set-top flash lamps have been using four AA batteries as inner power supply for a long time, for this reason, the battery accommodating cavity of the lamp holder consists of four AA battery accommodating cavities, while such type of set-top flash lamp has the following disadvantages: having unsatisfactory performance, especially the longer time of recycling and fewer number of flashes, the four AA batteries included in the lamp have a recycling period of 3.5 seconds or more when they are fully charged, and the recycling period becomes longer with the reduction of the battery power, therefore this type of lamp cannot meet the needs of the user to capture continuous scenes, at the same time, under the fully charged condition, it can flash up to about 200 times. To solve this problem, the user has to buy an additional external power supply box of high price, actually, one flash lamp, four nickel-hydrogen AA batteries, one AA battery charger, one external power supply box, and one external power supply box charger have become a standard layout for a user, otherwise it is difficult to meet the needs for shooting, and they are not convenient to carry. With the rapid development of mobile electronic devices, there are many new types of battery products in the market in recent years, such as high-capacity lithium batteries, but the inner battery for the set-top flash lamp of camera has not changed, still employs AA batteries, in addition to the factor of product inertia, the set-top flash lamp of camera is using rechargeable battery, and it is not suitable to fix into the lamp holder, accordingly when the battery life ends, the entire set-top flash lamp will basically scrapped together, If the high-capacity lithium battery is not fixed into the lamp holder, then the requirement for electrical connection contacts is very high, the construction even relates to the transformation of lamp holder die, therefore it is not difficult to understand why the existing set-top flash lamp continues to use AA batteries, the summary until now, Accordingly, the prior art needs further improvement.

SUMMARY

The object of the present application is to provide an improved set-top flash lamp for a camera, so as to overcome the technical problems in the prior art.

The set-top flash lamp of a camera according to the present application comprises a lamp holder and lamp cap, wherein the lamp cap is hinged onto the lamp holder and is capable of rotating relative to the lamp holder, the lamp holder has a battery accommodating cavity formed therein, it further comprises a battery accommodating cavity cover, wherein one lithium battery having an electrical output contact is received in the battery accommodating cavity, the electrical output contact having a shape of right angle laminate consisting of an end surface right-angled side and a bottom surface right-angled side, wherein the end surface right-angled side is disposed on a front end surface of the lithium battery, the bottom surface right-angled side is located on the bottom surface of the lithium battery, the battery accommodating cavity comprises an electrical access contact therein, the electrical access contact is arranged at least on the side wall of the battery accommodating cavity against the bottom surface of the lithium battery.

According to a preferable embodiment, the electrical access contact also has a shape of right angle laminate, it comprises a first right-angled side corresponding to the end surface right-angled side of the electrical output contact and a second right-angled side corresponding to the bottom surface right-angled side of the electrical output contact, one end of the second right-angled side is fixed onto the side wall of the battery accommodating cavity against the bottom surface of the lithium battery, and there is an included angle of 5 to 20 degrees between the second right-angled side and the side wall of the battery accommodation cavity against the bottom surface of the lithium battery.

The improved set-top flash lamp of a camera provided by the present application employs one lithium battery as in-box battery, which increases the recycling rate significantly compared with the existing set-top flash lamp of a camera. According to a preferable embodiment, because there may be a deformation for the electrical access contact in the insertion process of lithium battery, this deformation can enable the first right-angled side and the second right-angled side to contact with the end surface right-angled side and the bottom surface right-angled side of the electric output contact perfectly and simultaneously, and it has a lower contact resistance, accordingly the magnitude of the electric current for recycling will not be limited, and the recycle rate is only 1.5 seconds when it is fully charged, and it can flash more than 650 times after one charge, meanwhile, one lamp, one battery and one charger can meet the requirement of all kinds of situations. It has a relatively low cost compared to the prior art, so the object of the present application can be achieved.

Figure 1:
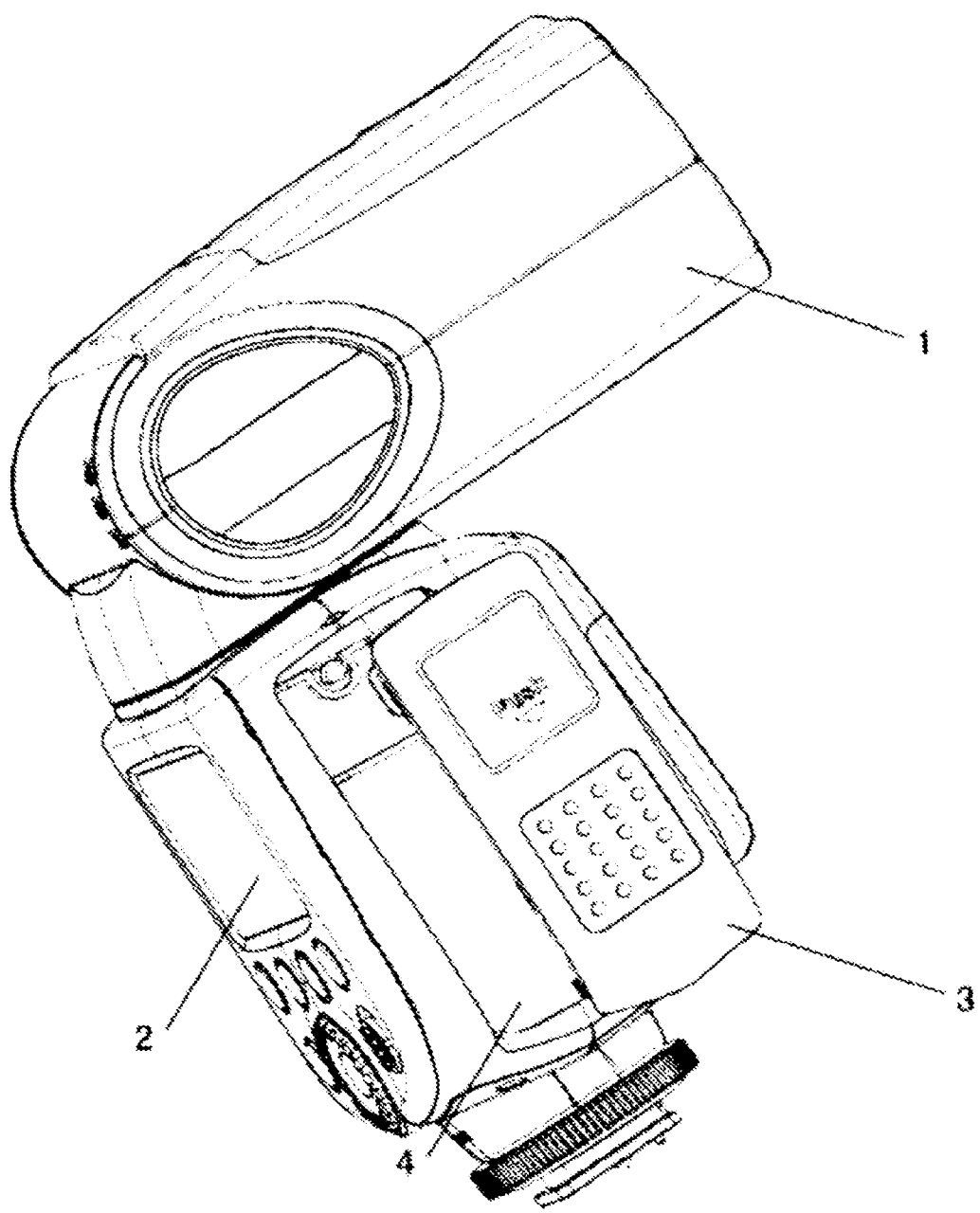
FIG. 1 is a schematic view of an improved set-top flash lamp of a camera according to a preferable embodiment of the present application.

IN THE DRAWINGS 1 lamp cap;
2 lamp holder;
3 battery accommodating cavity cover;
4 battery accommodating cavity;
5 lithium battery;

51 front end surface;
52 bottom surface;
6 electrical output contact;
61 end surface right-angled side;
62 bottom surface right-angled side;
7 electrical access contact;
71 the first right-angled side;
72 the second right-angled side;

DETAILED DESCRIPTION OF THE INVENTION

The present application will be further described by illustrating the present technical solution with reference to the improved set-top flash lamp of a camera according to a preferable embodiment of the present application and the accompanying figures.

Figure 2:
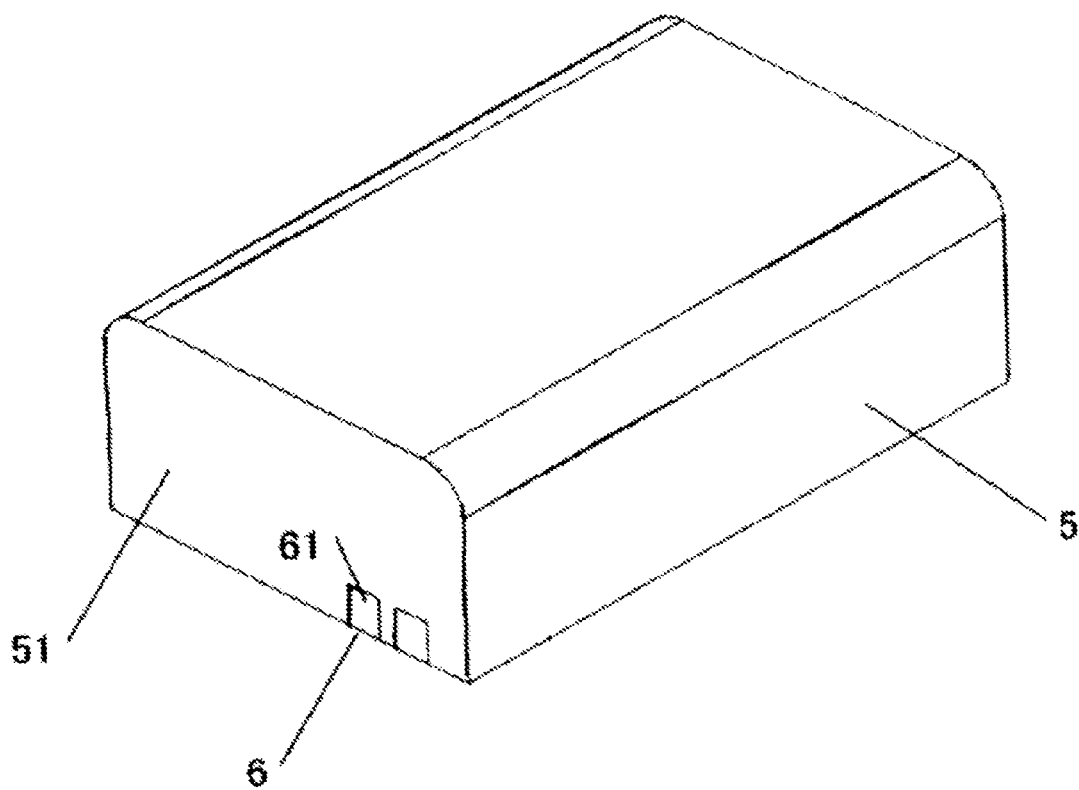
FIG. 2 is a schematic view of the lithium battery of the improved set-top flash lamp of a camera according to a preferable embodiment of the present application.
Figure 3:
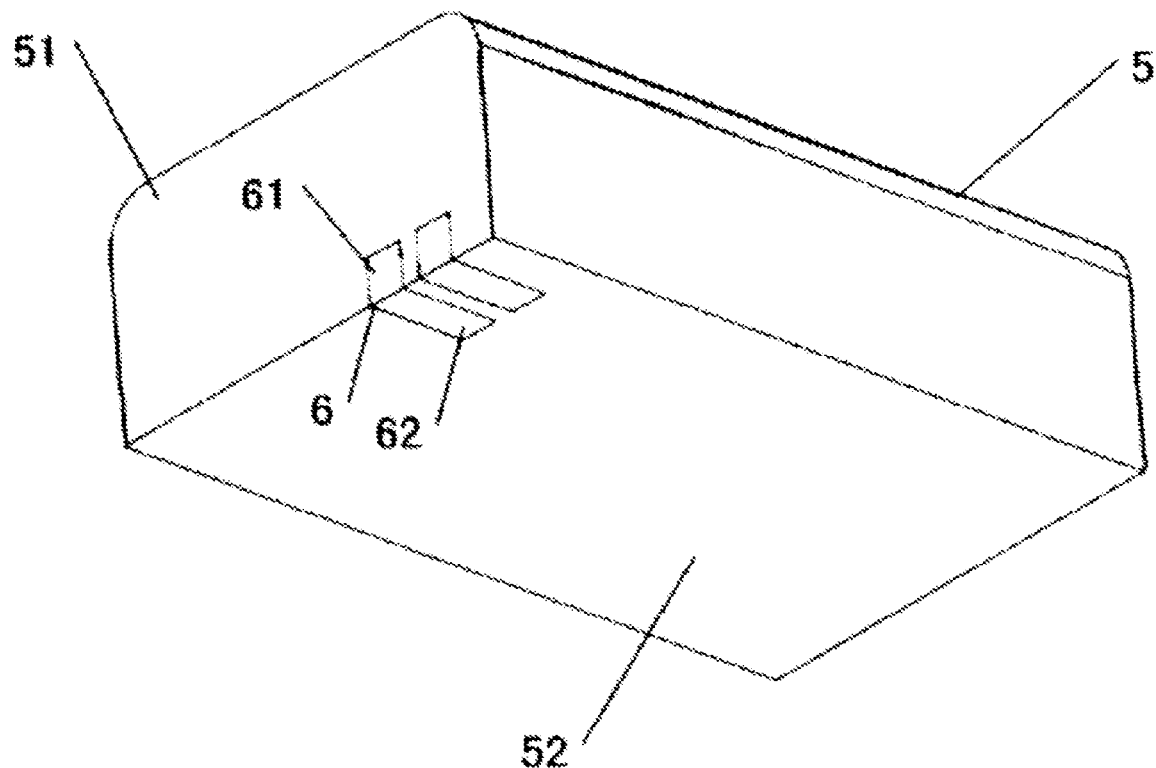
FIG. 3 is a schematic view of the lithium battery of improved set-top flash lamp of a camera according to a preferable embodiment of the present application in a different view compared with that of FIG. 2.
Figure 4:
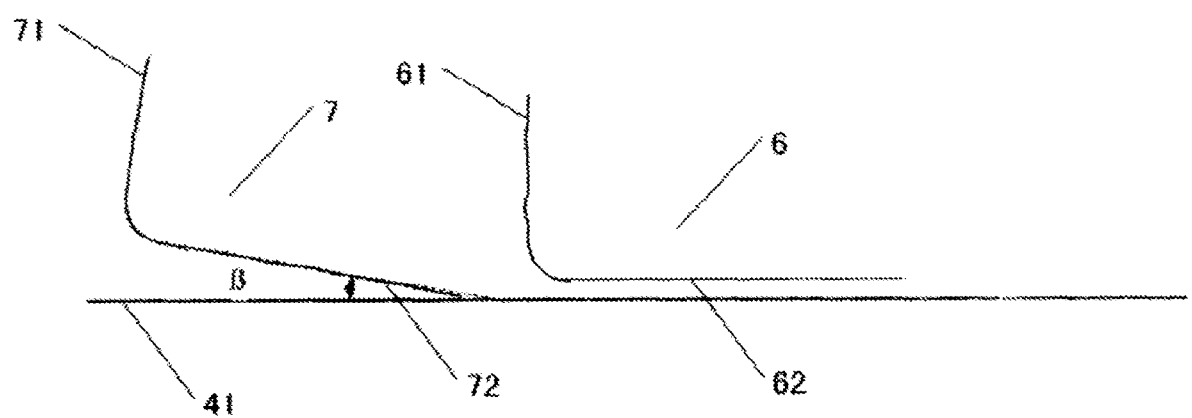
FIG. 4 is a schematic structural view of the electrical output contact and the electrical access contact of the improved set-top flash lamp of a camera according to a preferable embodiment of the present application.

Referring to FIGS. 1-4, a preferable embodiment of the present application provides an improved set-top flash lamp of a camera, which comprises a lamp holder 2 and lamp cap 1, wherein the lamp cap 1 is hinged onto the lamp holder 2 and is rotatable relative to the lamp holder 2, the lamp holder 2 has a battery accommodating cavity 3 formed therein, the set-top flash lamp further comprises a battery accommodating cavity cover, characterized in one lithium battery 5 with an electrical output contact 6 is received in the battery accommodating cavity 3, the electrical output contact 6 having a shape of right angle laminate consisting of an end surface right-angled side 61 and a bottom surface right-angled side 62, wherein the end surface right-angled side 61 is disposed 2 on a front end surface of the lithium battery 5, the bottom surface right-angled side 62 is located on the bottom surface 52 of the lithium battery 5, the battery accommodating cavity 3 comprises an electrical access contact 7 therein. According to the present embodiment, the electrical access contact 7 also has a shape of right angle laminate, it comprises a first right-angled side 71 corresponding to the end surface right-angled side 61 of the electrical output contact 6 and a second right-angled side 72 corresponding to the bottom surface right-angled side 62 of the electrical output contact 6, one end of the second right-angled side is fixed onto the side wall 41 of the battery accommodating cavity 3 against the bottom surface 52 of the lithium battery 5, and there is an included angle of β10 formed between the second right-angled side 72 and the side wall 41.

In summary, the improved set-top flash lamp of a camera according to the present application comprises a lamp holder and lamp cap, the lamp cap being hinged onto the lamp holder and rotatable relative to the lamp holder, the lamp holder having a battery accommodating cavity formed therein, the set-top flash lamp further comprises a battery accommodating cavity cover, characterized in, one lithium battery having an electrical output contact is received in the battery accommodating cavity, the electrical output contact having a shape of right angle sheet consisting of an end surface right-angled side and a bottom surface right-angled side, wherein the end surface right-angled side is disposed on a front end surface of the lithium battery, the bottom surface right-angled side is located on the bottom surface of the lithium battery, the battery accommodating cavity comprises an electrical access contact therein, the electrical access contact is arranged at least on the side wall of the battery accommodating cavity against the bottom surface of the lithium battery. The present application reduces the cost compared to the prior art.

What is claimed is:

1. An improved set-top flash lamp for a camera comprising a lamp holder and lamp cap, the lamp cap being hinged onto the lamp holder and rotatable relative to the lamp holder, the lamp holder having a battery accommodating cavity formed therein, wherein the set-top flash lamp further comprises a battery accommodating cavity cover, one lithium battery with an electrical output contact being received in the battery accommodating cavity, the electrical output contact having a shape of right angle laminate and consisting of an end surface right-angled side and a bottom surface right-angled side, wherein the end surface right-angled side is disposed on a front end surface of the lithium battery, the bottom surface right-angled side is located on the bottom surface of the lithium battery, wherein the battery accommodating cavity comprises an electrical access contact therein, the electrical access contact is arranged at least on the side wall of the battery accommodating cavity against the bottom surface of the lithium battery.

2. The set-top flash lamp of claim 1, wherein the electrical access contact also has a shape of right angle laminate and comprises a first right-angled side corresponding to the end surface right-angled side of the electrical output contact and a second right-angled side corresponding to the bottom surface right-angled side of the electrical output contact, one end of the second right-angled side being fixed onto the side wall of the battery accommodating cavity against the bottom surface of the lithium battery, and there is an included angle of 5 to 20 degrees between the second right-angled side and the side wall of the battery accommodation cavity against the bottom surface of the lithium battery.

* * * * *